United States Patent
Zosimadis et al.

(10) Patent No.: US 9,953,508 B2
(45) Date of Patent: Apr. 24, 2018

(54) SYSTEMS AND METHODS FOR AUTHENTICATING BULK PRODUCTS

(71) Applicant: Smart Wave Technologies Corp., Toronto, Ontario (CA)

(72) Inventors: Peter Zosimadis, Brampton (CA); Scott McMullen, Toronto (CA)

(73) Assignee: Smart Wave Technologies Corp., Toronto (CA)

( * ) Notice: Subject to any disclaimer, the term of this patent is extended or adjusted under 35 U.S.C. 154(b) by 123 days.

(21) Appl. No.: 13/849,259

(22) Filed: Mar. 22, 2013

(65) Prior Publication Data

US 2013/0218730 A1   Aug. 22, 2013

Related U.S. Application Data

(63) Continuation of application No. PCT/CA2012/001187, filed on Dec. 20, 2012.
(Continued)

(51) Int. Cl.
*G08B 21/18* (2006.01)
*G06Q 10/08* (2012.01)
(Continued)

(52) U.S. Cl.
CPC ......... *G08B 21/182* (2013.01); *G06Q 10/087* (2013.01); *G07F 13/02* (2013.01); *G07F 13/025* (2013.01); *G07F 13/04* (2013.01)

(58) Field of Classification Search
None
See application file for complete search history.

(56) References Cited

U.S. PATENT DOCUMENTS

| | | |
|---|---|---|
| 3,528,177 A | 9/1970 | Simjian |
| 2007/0069011 A1* | 3/2007 | Barton ............... A47F 9/047 235/381 |

(Continued)

FOREIGN PATENT DOCUMENTS

| | | |
|---|---|---|
| WO | 2012031354 A1 | 3/2002 |
| WO | 2006135758 A1 | 12/2006 |

OTHER PUBLICATIONS

International Search Report Application No. PCT/CA2012/001187 Completed: Mar. 19, 2013; dated Apr. 4, 2013 3 pages.
(Continued)

*Primary Examiner* — Russell S Glass
(74) *Attorney, Agent, or Firm* — Whitmyer IP Group LLC (57) ABSTRACT

This application generally relates to systems and methods for authenticating a bulk quantity of a consumable product with a corresponding product. More specifically, the invention associates a bulk quantity of the consumable product with a product parameter such as a consumption rate of the consumable product within the corresponding product; provides and authorizes a key and/or reader with the bulk quantity and consumption rate data to a specific corresponding product wherein the bulk quantity and consumption rate data are correlated to a maximum consumption quantity value; monitoring consumption of the consumable product within the corresponding product until the maximum consumption quantity value is reached; and providing an event output to the corresponding product when the maximum consumption quantity value is realized.

16 Claims, 3 Drawing Sheets

Related U.S. Application Data

(60) Provisional application No. 61/578,169, filed on Dec. 20, 2011.

(51) Int. Cl.
*G07F 13/02* (2006.01)
*G07F 13/04* (2006.01)

(56) References Cited

U.S. PATENT DOCUMENTS

| | | |
|---|---|---|
| 2007/0173980 A1 | 7/2007 | Lovett et al. |
| 2010/0059602 A1* | 3/2010 | Chiou et al. |
| 2010/0125364 A1* | 5/2010 | Ebrom .................... D06F 33/02 700/275 |
| 2010/0146587 A1* | 6/2010 | Sholes ..................... B67D 7/02 726/2 |
| 2010/0163573 A1 | 7/2010 | Wegelin et al. |
| 2011/0000964 A1 | 1/2011 | Coveley et al. |
| 2011/0059602 A1 | 3/2011 | Jeon et al. |
| 2011/0082595 A1 | 4/2011 | Mehus et al. |

OTHER PUBLICATIONS

European Search Report Application No. EP 12858948 Completed: Jul. 7, 2015, dated Jul. 30, 2015 8 pages.
Office Action U.S. Appl. No. 14/522,285 dated Jan. 17, 2017 10 pages.

\* cited by examiner

SYSTEMS AND METHODS FOR AUTHENTICATING BULK PRODUCTS

FIELD OF THE INVENTION

This application generally relates to systems and methods for authenticating a bulk quantity of a consumable product with a corresponding product. More specifically, the invention associates a bulk quantity of the consumable product with a product parameter such as a consumption rate of the consumable product within the corresponding product; provides and authorizes a key and/or reader with the bulk quantity and consumption rate data to a specific corresponding product wherein the bulk quantity and consumption rate data are correlated to a maximum consumption quantity value; monitoring consumption of the consumable product within the corresponding product until the maximum consumption quantity value is reached; and providing an event output to the corresponding product when the maximum consumption quantity value is realized.

BACKGROUND OF THE INVENTION

In today's competitive marketplace, the costs for companies to create, maintain, and grow new markets and market share is becoming increasingly expensive. Providing low cost systems of assuring the company's investment is protected by newcomers into the market place is increasing in demand. Previous systems of differentiating the authenticity of a product have generally focused on individual pieces. That is, if a manufacturer wants to ensure that a specific refill or consumable product (eg. a printer toner cartridge or a soap refill) is configured to specific equipment, that is the primary or corresponding product (eg. a printer or soap dispenser), each refill product will be individually provided with the authentication system that allows the refill product to be used with the primary product.

In cases where the individual consumable pieces are inexpensive or that have a physical shape that does not readily permit the inclusion of authentication systems, present authentication techniques are difficult to implement or are too expensive to justify the costs. For example, if the refill product is only worth a few pennies, the cost of incorporating an authentication system that may cost at least a few pennies to incorporate with the refill product cannot usually be justified.

Furthermore, for these types of products, as with other products that are readily marked, there has also been a need to enhance brand protection, to monitor and maintain shelf-life requirements and best-before dates, limit the life of a material, ensure non-compatible products are not used inappropriately for safety considerations, as well as for distribution control and prevention of cross selling into markets.

As described in co-pending application PCT/CA2011/001008, authentication technologies having electronic keying that utilize special optical coatings are effective and inexpensive methods of being able to differentiate between authentic products and counterfeit products on an individual basis. As described in PCT '008, individual products can be linked or keyed to a specific dispensing product using inexpensive LED emitters/receivers and special optical coatings. However, the PCT '008 technology generally requires that the two products are in close proximity to one another in order for the keying to be enabled and can thus be limited by a number of factors including the geometric limitations of the consumable and corresponding products.

In other words, and by way of example, with regards to bulk products, there has been a need for a system that enables the consumption of bulk products to be monitored without the need for marking each specific item. For example, it is more difficult and potentially expensive to mark individual hot drink stir sticks that may be used with a commercial stir stick dispenser. However, as is known, stir sticks are generally packaged and shipped in larger containers/boxes that may contain several hundred dozen individual sticks. As such, specifically keying individual stir sticks to a dispenser is difficult or impractical.

Thus, there is a need for an authentication system and methodology that is capable of and that is inexpensive enough to authenticate a wider range of products including odd-shaped and inexpensive products.

Further still, there has been a need for product authentication systems that can be readily retro-fit to existing equipment, such that existing equipment can be effective in ensuring that properly authenticated consumable products are used within the existing equipment without the need for extensive modifications to the existing equipment.

Further still, there has been a need for systems that can effectively monitor the consumption of product across a number of different pieces of equipment.

SUMMARY OF THE INVENTION

In accordance with the invention, there is provided a method of authenticating a bulk quantity of a consumable product with a corresponding product that utilizes the consumable product comprising the steps of: (a) associating a bulk quantity of the consumable product with a consumption parameter of the consumable product within the corresponding product; (b) authorizing a key with the bulk quantity and consumption parameter from step a) to a specific corresponding product wherein the bulk quantity and consumption parameter are correlated to a quantity value; (c) monitoring consumption of the consumable product within the corresponding product until the quantity value is reached; and (d) providing an event output to the corresponding product when the quantity value is realized.

In various embodiments, the event output is an audio and/or visual signal to an end-user; and/or the quantity value is any one of or a combination of total volume, total mass or time.

In another embodiment, the method further includes the step of altering the operation of the corresponding product when the quantity value is reached which may include increasing the amount of material being dispensed when the quantity value is reached, decreasing the amount of material being dispensed when the quantity value is reached or stopping the amount of material being dispensed when the quantity value is reached.

In various embodiments, the key contains data including any one of or a combination of product serial number, jurisdictional data, shelf-life or quantity data.

In another aspect, the invention provides a system for authenticating a bulk quantity of a consumable product with a corresponding product that utilizes the consumable product comprising: a key and reader for operative connection to the corresponding product, the key containing information relating to a consumption parameter of the consumable product and the reader having a controller for monitoring the consumption parameter of the consumable product within the corresponding product as the consumable product is being consumed relative a to quantity value; the controller monitoring consumption of the consumable product within the corresponding product and determining when the quantity value is reached, the controller providing an event output when the quantity value is reached to an output event circuit operatively connected to the controller.

In further embodiments, the output event circuit includes an audio and/or visual circuit for providing an audio or visual signal to an end-user.

In other embodiments, the quantity value is any one of or a combination of total volume, total mass or time.

In other embodiments, the controller includes means for altering the operation of the corresponding product when the quantity value is reached which may include increasing the amount of material being dispensed when the quantity value is reached, decreasing the amount of material being dispensed when the quantity value is reached or stopping the amount of material being dispensed when the quantity value is reached. The key may also contain data including any one of or a combination of product serial number, jurisdictional data, shelf-life or quantity data.

In yet another aspect, the invention provides a retro-fit system for detecting consumption of a consumable product with a corresponding product that utilizes the consumable product, the system for retro-fit connection to the corresponding product, the system comprising: a body for attachment to the corresponding product, the body operatively containing: a controller operatively connected to a power supply; a reader operatively connected to the controller, the reader for operative connection with a key containing quantity information relating to the consumable product; a use detector operatively connected to the controller for detecting operation events of the corresponding product; wherein the controller includes a counter for counting operation events and includes means for calculating total consumption and comparing total consumption to the quantity information, the controller having means to activate an alarm system operatively connected to the controller in the event that total consumption exceeds the quantity information.

In one embodiment, the system includes a solar cell operatively connected to the controller and power supply for providing solar energy to the power supply.

In further embodiments, the system may also include a communication interface operatively connected to the controller for communicating any one of or a combination of total consumption information or alarm events to a computer network.

In another embodiment, the system includes a communication interface operatively connected to the controller for communicating any one of or a combination of total consumption information or alarm events to an adjacent retrofit system.

In another aspect, the invention includes two or more retro-fit systems, each for detecting consumption of a consumable product with a corresponding product and each operatively connected to separate corresponding products and wherein each retro-fit system includes means for communicating consumption data between each retro-fit system. In these embodiments, each controller may calculate total consumption based on consumption information received from each retro-fit system for determining if an alarm condition exists. Key information between each controller can also be exchanged to provide authorization to multiple retro-fit systems within a network.

BRIEF DESCRIPTION OF THE DRAWINGS

The invention is described with reference to the accompanying figures in which.

DETAILED DESCRIPTION OF THE INVENTION

With reference to the figures, various embodiments of systems and methods for authorizing bulk products with specific dispensing apparatus are described. In addition, systems and methods of retro-fitting authorization technology to existing equipment are described.

In the context of this invention, bulk or consumable products generally mean products that may be any one of or a number of difficult to mark, relatively inexpensive and/or that are normally shipped in larger containers with a number of smaller packages/containers within the bulk shipment. These products are generally used with a corresponding product that will either dispense or use the consumable product and which collectively constitute a product pair. Examples of such product pairs include but are not limited to food product dispensers (eg. breakfast cereal, condiment and milk dispensers), bulk chemical dispensers (eg. soap, window cleaner, surface sanitizer dispensers), and product dispensers (eg. hot drink stir stick dispensers).

Figure 1:
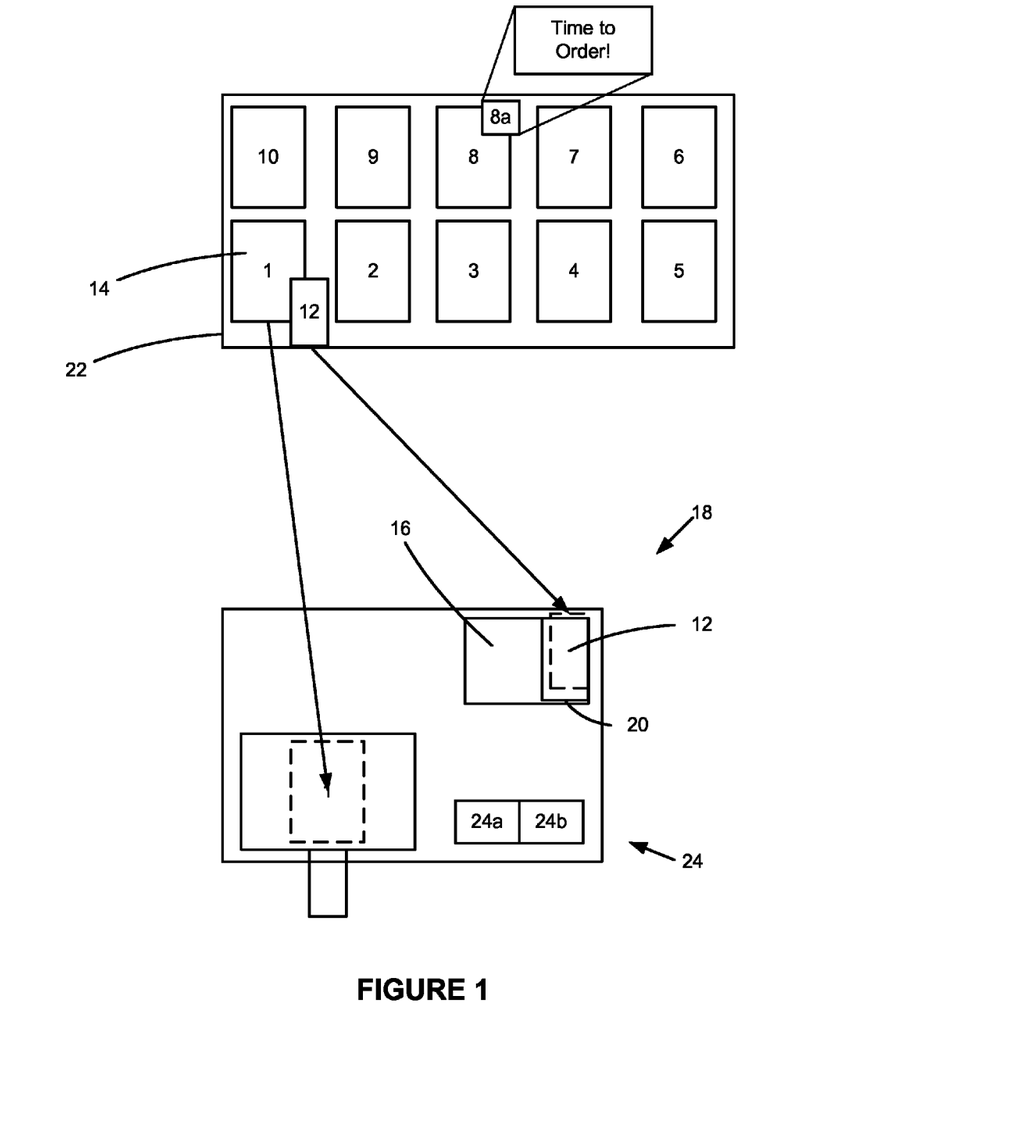
FIG. 1 is a schematic diagram of a key and reader system on a corresponding product (eg. dispenser) and a corresponding bulk product in accordance with one embodiment of the invention.

As shown in FIG. 1, generally the invention provides a key 12 that is associated with a bulk product or container 22 and that is coded to contain information about a consumable product 14 that may be within a smaller package within a bulk container 22. The key is interfaced with a reader 16 within a dispensing apparatus 18 that can read and obtain data from the key. The key contains information about the consumable product such that the dispensing apparatus 18 (dispenser) will operate in an unrestricted mode only if the key is interfaced (eg. within a slot or opening 20) with the dispenser and is otherwise being operated consistently within the authorized parameters of the consumable product.

For example, a restaurant operator may provide a breakfast cereal dispenser 18 into which fixed volumes/weights of bagged breakfast cereal are inserted. An end user typically uses the dispenser by approaching the dispenser and turning a knob in order to dispense a fixed volume of breakfast cereal. During normal operation, restaurant staff will periodically monitor the level of breakfast cereal in the dispenser and when the levels become low, re-fill the cereal dispenser with a pre-packaged volume of breakfast cereal from a store room.

As shown in FIG. 1, the cereal for each re-fill may be contained in a plastic bag that was purchased as a bulk shipment 22 of breakfast cereal. For the purposes of illustration, the bulk shipment may contain 10 bags of breakfast cereal (numbered 1 to 10). In this case, after retrieving a bag of breakfast cereal from the bulk shipment box, the restaurant staff will simply open a new bag of cereal and pour it into the dispenser. As can be appreciated, as the plastic bag is thrown away immediately after emptying, marking the individual plastic bag with specific coded information will be of little use for the purposes of keying as the bag itself is not interfaced with the cereal dispenser. Moreover, busy restaurant staff cannot be concerned with ensuring that proper keying is occurring every time they fill up a breakfast cereal dispenser.

However, and in accordance with the invention, replacing a key in the dispenser each time a new bulk shipment box is opened can provide an effective system for ensuring that the authorized breakfast cereal is used in the dispenser and involvement with end-users is minimal. In our example, the bulk shipment box 22 is provided with a key 12 that can be interfaced with the dispenser 18 and contain information that permits operation of the dispenser for a specific period of time and/or to dispense a specific quantity of product. Upon the expiry of the specific parameters of the key (primarily a maximum quantity), the dispenser will prevent operation of the dispenser and/or signal that new product is required. For example, the key may be coded to permit the equivalent of 10 bags of cereal to be dispensed from the dispenser. Thus, after the assumed volume/weight of 10 bags of cereal (with appropriate allowances), the dispenser may be shut-down. If the dispenser is shut-down, this will provide a clear signal to the end-user (i.e. restaurant staff) that a new key must be interfaced with the dispenser.

Alternatively, the dispenser may simply signal through a signal system 24 that the key has expired by a visual 24a and/or audio 24b signal that will continue until a new key is inserted. In this case, the dispenser may not be shut-down upon the expiry of the key where, in this embodiment it would be assumed that the warning signal is sufficient reminder to the end-users that an authorized product key must be interfaced with the dispenser to ensure that authorized product is used with the dispenser.

While a system only incorporating a signal system that does not completely shut-down a dispenser will not absolutely prevent the use of unauthorized product in the dispenser, as a user could add cereal to the dispenser that has been obtained from a non-authorized manufacturer, at the very least the warning system will substantially reduce the use of unauthorized products as the warning system may be sufficiently disruptive to the operation of the dispenser that it will motivate the end-user to obtain a new key.

In various embodiments, the packaging of the bulk product may also be configured to ensure that opening the bulk product ensures that the first product out of the box is matched with a new key to ensure that the new key is paired with the dispenser when the first product is used. In our example, the key 12 is attached to bag 1 and would be clearly marked to ensure it is the first product to be used. In one embodiment, each product is marked with a number to advise users the order in which the product should be utilized. In one embodiment, after consumption of a certain percentage of the bulk product, a visual reminder 8a (eg. a card) may also be provided to remind a user to order new bulk product although this can also be achieved electronically through the system as described below.

As can be understood, the above technology can be applied to a wide array of dispenser/product pairs such as laundry machines/soap, dishwashers/soap, paper dispensers/paper, hand sanitizers/sanitizer, waxing machines/wax, milk dispensers/milk as well as many other products.

In various embodiments, the key can be configured with a variety of data. As noted above, this can be an authorized weight/volume of product and/or a time parameter. Time-based authorizations can be utilized to ensure that shelf life/expiry dates are respected. That is, in the case of a product such as a milk dispenser/milk container product pair, the milk dispenser may monitor both the weight/volume of milk being dispensed as well as the shelf-life date.

In this example, the bulk quantity of milk may have a code that indicates that 25 liters of milk can be dispensed as well as a code indicating that the shelf-life of the product is 7 days. Upon the expiry of either parameter, the dispenser may then enter an unauthorized condition where one or more alarms are presented to the user.

In addition, authorization to ensure distribution control can also be implemented. As an example, a manufacturer may wish to prevent a distributor in one jurisdiction from selling into another jurisdiction. That is, a first distributor may be authorized by a manufacturer to sell product in a first jurisdiction but not be authorized to sell product into a second jurisdiction due to contractual obligations with a second distributor in a second jurisdiction. However, in the absence of authorization technology that does not individually mark each end-product, it is effectively impossible to enforce jurisdictional boundaries with each distributor. With the subject system, an appropriate jurisdictional code can be attached to each bulk shipment to ensure that a product can effectively only be paired to a corresponding product of the product pair in an authorized jurisdiction.

Importantly, the subject system also allows the cost of authentication between product pairs to be reduced as many of the disadvantages of specific dispenser/product pairing can be obviated. For example, in many product pairs, there is substantial additional cost associated with incorporating authentication technology within the specific geometries of products. That is, in order to ensure that a dispenser using a specific refill cartridge can authenticate in a manner that is reliable and/or possible, significant geometric limitations of the physical dimensions of the products may have to be overcome in order to effectively provide product pair linking.

In the subject system, the key system may be substantially simplified in terms of its geometric shape and/or size. For example, the key could be a simple, thin paper or plastic card that contains the authorization information. Similarly, the reader may be a simple slot that receives the key. Importantly, by simplifying the geometry between the key and reader in such a way that it is not actually on the product packaging or otherwise incorporated into the consumable product, allows the key and reader to be located in favorable locations on the dispenser. For example, the reader can likely be configured to a position of the dispenser where there is naturally dead volume within the dispenser and thus may be more readily incorporated into existing dispenser designs.

Figure 2:
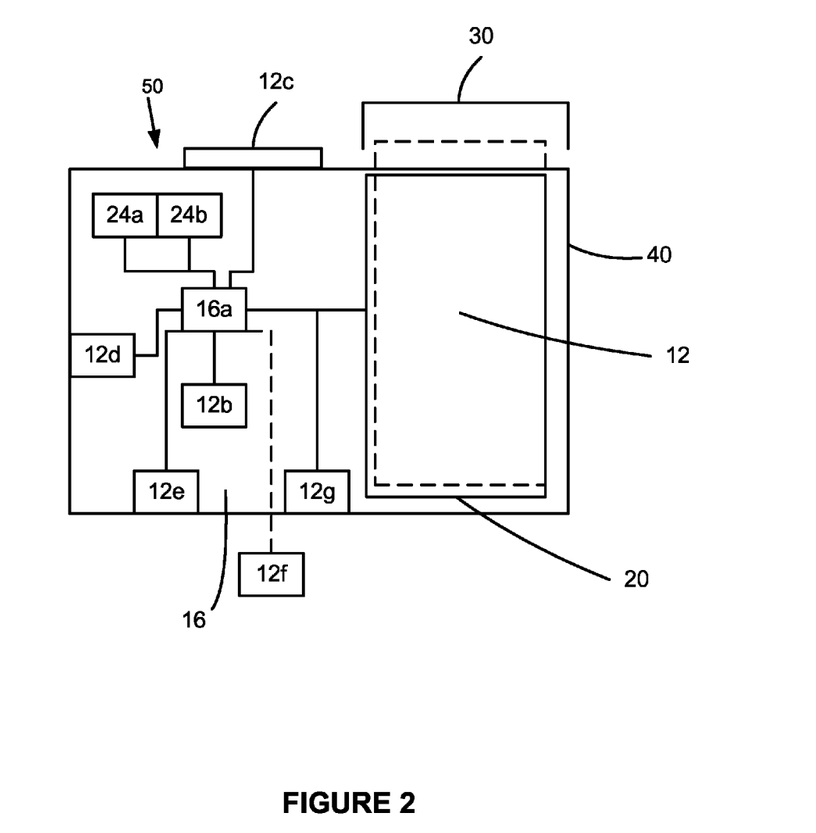
FIG. 2 is a schematic diagram of a retro-fit kit for use with a corresponding product (eg. a dispenser) in accordance with one embodiment of the invention; and, FIG. 3 is a flow chart illustrating typical logic utilized in monitoring the consumption of a consumable product in accordance with one embodiment of the invention.

Furthermore, the key and reader may also be established as a retro-fit kit for certain products, where an existing dispenser can be retrofit to include bulk authorization functionality. As shown in FIG. 2, a retro-fit kit 50 may include a reader 16 for receiving a key 12 within a slot 20 and associated authorization electronics contained within a compact package. Typically, the package will include means to interrupt power 12f to the dispenser and/or provide a visual or audio warning through an output system 24a, 24b to an end-user. While a specific retro-fit kit may be designed for a specific dispenser, based on the specific shape and available volumes within the dispenser, many different dispensers may be able to utilize the same kit to achieve the desired functionality given that many dispensers will have at least a minimum available volume for configuration of the kit.

In one embodiment, the kit may be externally configured to the dispenser and only utilize a visual or audio warning system 24a, 24b that does not require wiring to the dispenser. For example, the retro-fit kit may be a box 40 that is permanently or semi-permanently attached to the exterior of the dispenser. In this case, a manufacturer with a line of dispensers may retroactively connect a retro-fit authentication system to the exterior of the dispenser by an appropriate attachment system such as screws, bolts, two-side adhesive tape and/or glue. The manner in which the authentication system is attached may be sufficiently secure that attempts to remove the retro-fit kit will result in damage to the dispenser, although this may not be required for certain installations. The box will contain an appropriate controller 16a and reader 20 to interface with a key 12 as described above.

In one embodiment, the retro-fit kit will include a rechargeable battery 12b that is configured to a solar cell 12c for charging the battery. In this embodiment, which will be particularly useful for dispensers that are deployed in lighted locations, the solar cell will ensure that the battery remains charged such that, the warning system will be able to provide its warning for a substantial period of time, for example, for at least several weeks, and potentially indefinitely in the event that the solar power cell has a sufficient power rating to provide continuous power. In this case, the controller 12a may also be programmed to provide an alarm sequence that is balanced to the availability of power within the battery. In the case of an audio alarm, the alarm needs only to be sufficiently loud in order to be noticeable but not so loud as to be uncomfortable. While a visual alarm may also be implemented, on its own this may be less preferred.

In those embodiments where the retro-fit kit is simply configured to the exterior of the dispenser and does not directly interface with the internal dispensing mechanisms of the dispenser, the detection of operation events such as rates of consumption can be implemented for certain types of dispensers. For example, for those dispensers that include a motor (or systems that produce identifiable physical effects) that is actuated each time a dispenser operation occurs, the retro-fit kit may include a vibration sensor 12d (or similar device) that would detect the movement of the motor or related or similar components. Thus, the retro-fit kit could detect and monitor the number of dispense operations to calculate when an authorization key is no longer valid. As an example, in the case of a soap dispenser, the soap dispenser may include a motor and valve mechanism to dispense a fixed volume of soap with each actuation. In this case, after an authorization key has been inserted into the retro-fit kit box 40, the retro-fit kit controller 16a would simply count the number of dispenses by detecting motor vibration each time the motor is turned on. Thus, based on the knowledge of the volume per dispense, the number of valid dispenses can be calculated. After reaching the threshold number of dispenses, the alarm system 24a, 24b would be actuated. Other types of sensors may also be provided including strain gauges, optical and/or ultrasonic sensors.

This system may also be used as a retro-fit notification system for advising personnel that a consumable product is nearing exhaustion and will need replacement. In this aspect of the invention, the retro-fit notification system may be implemented without the bulk authentication concepts described above and may simply be a means of advising when an individual quantity of a consumable product is nearing exhaustion. In this case, for example when 80% of the product has been consumed, the alarm system may actuate at a first level, perhaps flashing a small LED light at a 5 second interval. When 90% of the product has been consumed, the alarm system may flash the LED light at a 2 second interval. When 95% of the product has been consumed, the alarm system may add an audio alarm at a 10 second interval. Thus, when service personnel are in the proximity of the dispenser, they can make a determination of the level of product remaining in the dispenser. As understood by those skilled in the art, any number of alarm conditions may be designed and incorporated.

In addition to motor vibration sensors, other means of detecting the number of actuations may be used. For example, the retro-fit kit may include an infra-red or ultrasonic sensor 12e that detects the presence of an end-user and base the consumption calculation on the number of times an end-user is detected.

The ability to retro-fit an authentication system to product pairs may be particularly beneficial within certain businesses or chains of business where factors such as product quality are essential components of a business. For example, in the case of franchises, it is often very important for franchisers to control the supply of product to their franchisees to ensure that customers receive product of consistent quality across multiple locations and over time. Very often, the good will of the franchise business will depend on the consistency of the product that is delivered to customers. While a franchise contract may require that product be purchased from authorized sources, it may be difficult to ensure that the actual product being sold was in fact purchased from an authorized source.

For example, while a national chain of coffee shops may require that only coffee of a specific brand is used in the coffee brewing machines of the franchise, a franchisee may choose to utilize another (possibly less expensive) source of coffee in the coffee machine. However, if a retro-fit authorization kit is configured to a coffee machine, the retro-fit kit may be able to count the number of brew cycles the coffee machine goes through as a measurement of the consumption of coffee and thereafter activate the alarm system if an alarm condition is detected.

In situations where multiple dispensing machines may be utilizing bulk product from a single bulk shipment (as shown in FIG. 1), different dispensers may have to share information to ensure that consumption rates are being properly monitored. Accordingly, a retro-fit circuit may also include wireless functionality in the form of a communication interface 12g that collectively enables adjacent machines to monitor the total consumption rates across more than one machine. In addition, if consumable product is being received from a single bulk packaging source, the controller in each adjacent retro-fit unit may share key information across a network such that only a single key is required to provide authorization to multiple retro-fit units.

Wireless technology may also be utilized as a reminder to users when to initiate the re-ordering of product. For example, a coffee machine that has calculated that 50 pots of coffee have been brewed since the authentication key was interfaced with the coffee machine, may initiate a network event that triggers an email, SMS, or similar alert being sent to an owner to order additional coffee. Communicative technology, including both wireless and wired technology, may also be utilized to inform of non-compliance events. For example, if a franchisee is utilizing a non-authorized coffee bean, an alert can be generated by a communication interface 12g and sent to the franchiser to inform of the non-compliance event.

In various embodiments, the keying system will also only be accessible to higher level users (eg. restaurant staff) as opposed to final end-users (eg. customers). For example, in our bulk cereal example, restaurant staff (higher level user) may have access to the authentication key 12 only when a dispenser cabinet is opened with a regular lock key so as to minimize the risk of tampering by the end-user (restaurant customer).

For the retro-fit kit embodiment, similarly a lock or cover 30 may be provided that requires a regular lock key to open in order to prevent end-user access to the key 12.

Authentication

Authentication can occur using a variety of authentication methodologies and systems including the authentication systems as described in U.S. Pat. No. 7,793,839 and co-pending application PCT/CA2011/001008 incorporated herein by reference. Other authentication systems could include bar codes, magnetic stripe, smart cards etc. Codes will typically include serial numbers and product specific codes that represent authorized weights/volumes/times etc. Importantly, the key and reader combinations may utilize read-only or read/write technologies depending on the specific product pair and requirements of the manufacturers/distributors and/or end users. In the read/write scenario, after the expiry of the product specific code (i.e. the weight/volume/time code), the code on the key may be irreversibly altered to prevent future reading of the code by any reader.

Figure 3:
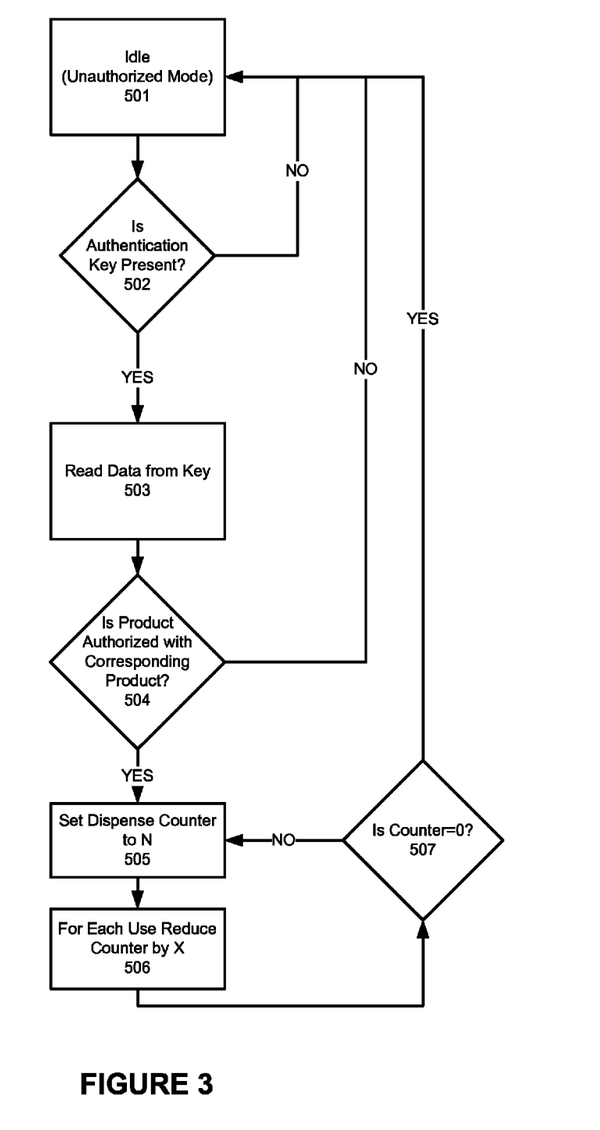

FIG. 3 is a flow chart depicting a typical process by which electronics in the corresponding product (eg. a dispenser) would monitor consumption of a consumable product. While an authorization key is not present 501 the system would be in an unauthorized mode and operation of the dispenser would be in a corresponding condition (eg. Increasing, decreasing the dispensed quantity of product and/or preventing operation and/or providing a visual/audio signal). If the authorization key is present 502, data from the key would be read 503 and determined if the product was authorized with the dispenser 504. If the product was authorized, a dispense counter would be set to a value N 505 and would decrease the counter by one with each use 506. The dispenser would continue to operate while the counter was greater than zero 507. For any condition that was interpreted as unauthorized, the system would return to idle 501.

Although the present invention has been described and illustrated with respect to preferred embodiments and preferred uses thereof, it is not to be so limited since modifications and changes can be made therein which are within the full, intended scope of the invention as understood by those skilled in the art.

What is claimed is:

1. A method of authenticating a bulk quantity of a consumable product with a key which enables a dispenser to enable a plurality of distinct user-initiated consumption events of the consumable product comprising the steps of:
   a) reading a key, using a key reader, the key reader being operatively connected to a controller, wherein the key comprises information relating to a consumption parameter of the consumable product;
   b) authorizing, using the controller, the read key with a bulk quantity and the consumption parameter from step a) to a specific dispenser wherein the bulk quantity and consumption parameter are correlated to a quantity value;
   c) monitoring, using a use detector operatively connected to the controller, consumption of the consumable product over a plurality of distinct user-initiated consumption events thereby monitoring how much consumable has been consumed over a period of time until the quantity value is reached, wherein before the quantity value is reached the authentication of the bulk quantity of consumable product remains valid;
   d) enabling, using the controller, an event output in response to the quantity value being reached, wherein the event output comprises altering the operation of the dispenser when the quantity value is reached.

2. The method as in claim 1 wherein the event output comprises an audio and/or visual signal to an end-user.

3. The method as in claim 1 wherein the quantity value is any one of or a combination of total volume, total mass or time.

4. The method as in claim 3 wherein where the quantity value includes a time value.

5. The method as in claim 1, wherein altering the operation of the dispenser comprises increasing the amount of material being dispensed when the quantity value is reached.

6. The method as in claim 1, wherein altering the operation of the dispenser comprises decreasing the amount of material being dispensed when the quantity value is reached.

7. The method as in claim 1, wherein altering the operation of the dispenser comprises stopping the amount of material being dispensed when the quantity value is reached.

8. The method as in claim 1 where the key contains data including any one of or a combination of product serial number, jurisdictional data, shelf-life or quantity data.

9. A system for authenticating a bulk quantity of a consumable product with a key which enables a dispenser to enable a plurality of distinct user-initiated consumption events of the consumable product, the system comprising:
   a controller, a key reader, and a use detector, the key reader and the use detector each being operatively connected to the controller, wherein the system is configured to:
      read a key, using the key reader, the key containing information relating to a consumption parameter of the consumable product;
      authorize, using the controller, the read key with a bulk quantity and the read consumption parameter to a specific dispenser wherein the bulk quantity and consumption parameter are correlated to a quantity value;
      monitor, using the use detector, consumption of the consumable product over a plurality of distinct user-initiated consumption events thereby monitoring how much consumable has been consumed over a period of time until the quantity value is reached, wherein before the quantity value is reached the authentication of the bulk quantity of consumable product remains valid; and
      enable an event output in response to the quantity value being reached, wherein the event output comprises altering the operation of the dispenser when the quantity value is reached.

10. The system as in claim 9 wherein the output event circuit includes an audio and/or visual circuit for providing an audio or visual signal to an end-user.

11. The system as in claim 9 wherein the quantity value is any one of or a combination of total volume, total mass or time.

12. The system as in claim 11 wherein where the quantity value includes a time value.

13. The system as in claim 9 wherein the dispenser is a dispenser and the controller includes means for increasing the amount of material being dispensed when the quantity value is reached.

14. The system as in claim 9 wherein the dispenser is a dispenser and the controller includes means for decreasing the amount of material being dispensed when the quantity value is reached.

15. The system as claim 9 wherein the dispenser is a dispenser and the controller includes means for stopping the amount of material being dispensed when the quantity value is reached.

16. The system as in claim 9 where the key contains data including any one of or a combination of product serial number, jurisdictional data, shelf-life or quantity data.

* * * * *